US012298686B2

(12) United States Patent
Kainuma et al.

(10) Patent No.: US 12,298,686 B2
(45) Date of Patent: May 13, 2025

(54) IMAGE FORMING APPARATUS

(71) Applicant: KYOCERA Document Solutions Inc., Osaka (JP)

(72) Inventors: Takashi Kainuma, Osaka (JP); Kenichiro Kawasaki, Osaka (JP); Kazuhisa Hirahara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/627,675

(22) Filed: Apr. 5, 2024

(65) Prior Publication Data

US 2024/0345512 A1 Oct. 17, 2024

(30) Foreign Application Priority Data

Apr. 12, 2023 (JP) ................................ 2023-064751

(51) Int. Cl.
*G03G 15/01* (2006.01)
*G03G 15/16* (2006.01)

(52) U.S. Cl.
CPC ......... *G03G 15/162* (2013.01); *G03G 15/161* (2013.01); *G03G 15/1615* (2013.01)

(58) Field of Classification Search
CPC . G03G 15/161; G03G 15/1615; G03G 15/162
USPC ................................................ 399/302, 308
See application file for complete search history.

(56) References Cited

FOREIGN PATENT DOCUMENTS

| | | | |
|---|---|---|---|
| CN | 108693745 | * | 10/2018 |
| JP | 2010-049095 A | | 3/2010 |
| JP | 2022166377 | * | 11/2022 |

* cited by examiner

*Primary Examiner* — Hoan H Tran
(74) *Attorney, Agent, or Firm* — Stein IP, LLC

(57) ABSTRACT

Provided is an image forming apparatus including: an apparatus main body; an intermediate transfer unit; and an image-bearing-member unit. the intermediate transfer unit includes an intermediate transfer belt, a frame, a drive roller, a tension roller, a transfer roller that is movable between a transfer position and a retractive position. The frame includes a first protrusion. The image-bearing-member unit includes an image bearing member, and a first regulating guide that extends in an axial direction of the image bearing member, and that faces the first protrusion in the upper-and-lower direction. The intermediate transfer belt and the image bearing member face each other with a predetermined length therebetween under a state in which the first protrusion and the first regulating guide are held in contact with each other, and in which the transfer roller has come to the retractive position.

5 Claims, 8 Drawing Sheets

IMAGE FORMING APPARATUS

INCORPORATION BY REFERENCE

This application is based on and claims the benefit of priority from Japanese Patent Application No. 2023-064751 filed on Apr. 12, 2023, the contents of which are hereby incorporated by reference.

BACKGROUND

The present disclosure relates to an image forming apparatus.

Hitherto, image forming apparatuses of an intermediate transfer type have been known. Such an image forming apparatus includes an intermediate transfer unit and a plurality of image-bearing-member units. The intermediate transfer unit can be installed into and removed from a main body of the image forming apparatus (hereinafter, referred to as an "apparatus main body"). The intermediate transfer unit includes an endless intermediate-transfer belt that is rotated in a predetermined direction.

The image-bearing-member units each include an image bearing member. The image bearing member is supported to be rotatable. The image bearing member faces the intermediate transfer belt in an upper-and-lower direction. The image bearing member bears a toner image on its outer peripheral surface. The image-bearing-member unit forms an image on an outer peripheral surface of the intermediate transfer belt.

Such an intermediate transfer unit includes a frame and transfer rollers. The frame is arranged inside the intermediate transfer belt. The transfer rollers are supported to be rotatable by the frame. The transfer rollers are movable between a transfer position (position at which the transfer rollers are held in press contact with the image bearing members with the intermediate transfer belt sandwiched therebetween), and a retractive position (position to which the transfer rollers that have been separated together with the intermediate transfer belt from the image bearing members come). At the transfer position, the transfer rollers primarily transfer the toner images borne on the image bearing members onto the intermediate transfer belt.

The image-bearing-member units allow the toner images in respective colors, the toner images having been borne respectively on the image bearing members, to be primarily transferred onto the intermediate transfer belt in a manner that the toner images are sequentially superimposed on each other. After that, the toner images that have been primarily transferred on the intermediate transfer belt are transferred (secondarily transferred) at once onto sheets (recording media such as sheets to be printed, envelopes, postcards, or overhead transparencies).

SUMMARY

According to an aspect of the present disclosure, there is provided an image forming apparatus including: an apparatus main body; an intermediate transfer unit; and an image-bearing-member unit.

The intermediate transfer unit
- includes an endless intermediate-transfer belt, and
- can be installed into and removed from the apparatus main body.

The image-bearing-member unit
- faces the endless intermediate-transfer belt in an upper-and-lower direction, and
- is configured to form an image on an outer peripheral surface of the endless intermediate-transfer belt.

The image-bearing-member unit includes an image bearing member
- that faces the endless intermediate-transfer belt, and
- that is configured to bear a toner image on an outer peripheral surface of the image bearing member.

The intermediate transfer unit includes
- a frame that is arranged inside the endless intermediate-transfer belt,
- a drive roller
  - that is supported to be rotatable by the frame, and
  - that is configured to rotate the endless intermediate-transfer belt by being held in press contact with an inner peripheral surface of the endless intermediate-transfer belt,
- a tension roller
  - that is supported to be rotatable by the frame, and
  - that is rotated along with the rotation of the endless intermediate-transfer belt by being held in press contact with the inner peripheral surface of the endless intermediate-transfer belt, and
  - that is configured to apply predetermined tension to the endless intermediate-transfer belt by being held in press contact with the inner peripheral surface of the endless intermediate-transfer belt, and
- a transfer roller
  - that is supported to be rotatable by the frame, and
  - that is movable between
    - a transfer position at which the transfer roller transfers the toner image borne on the outer peripheral surface of the image bearing member onto the outer peripheral surface of the endless intermediate-transfer belt by being held in press contact with the image bearing member with the endless intermediate-transfer belt sandwiched between the transfer roller and the image bearing member, and
    - a retractive position to which the transfer roller that has been separated together with the endless intermediate-transfer belt from the image bearing member comes.

The frame includes a first protrusion that protrudes in the upper-and-lower direction to a side where the image-bearing-member unit is present relative to the outer peripheral surface of the endless intermediate-transfer belt.

The image-bearing-member unit further includes a first regulating guide
- that extends in an axial direction of the image bearing member, and
- that faces the first protrusion in the upper-and-lower direction.

The endless intermediate-transfer belt and the image bearing member face each other with a predetermined length between the endless intermediate-transfer belt and the image bearing member under a state
- in which the first protrusion and the first regulating guide are held in contact with each other, and
- in which the transfer roller has come to the retractive position.

DETAILED DESCRIPTION

<Overall Configuration of Image Forming Apparatus>

Figure 1:
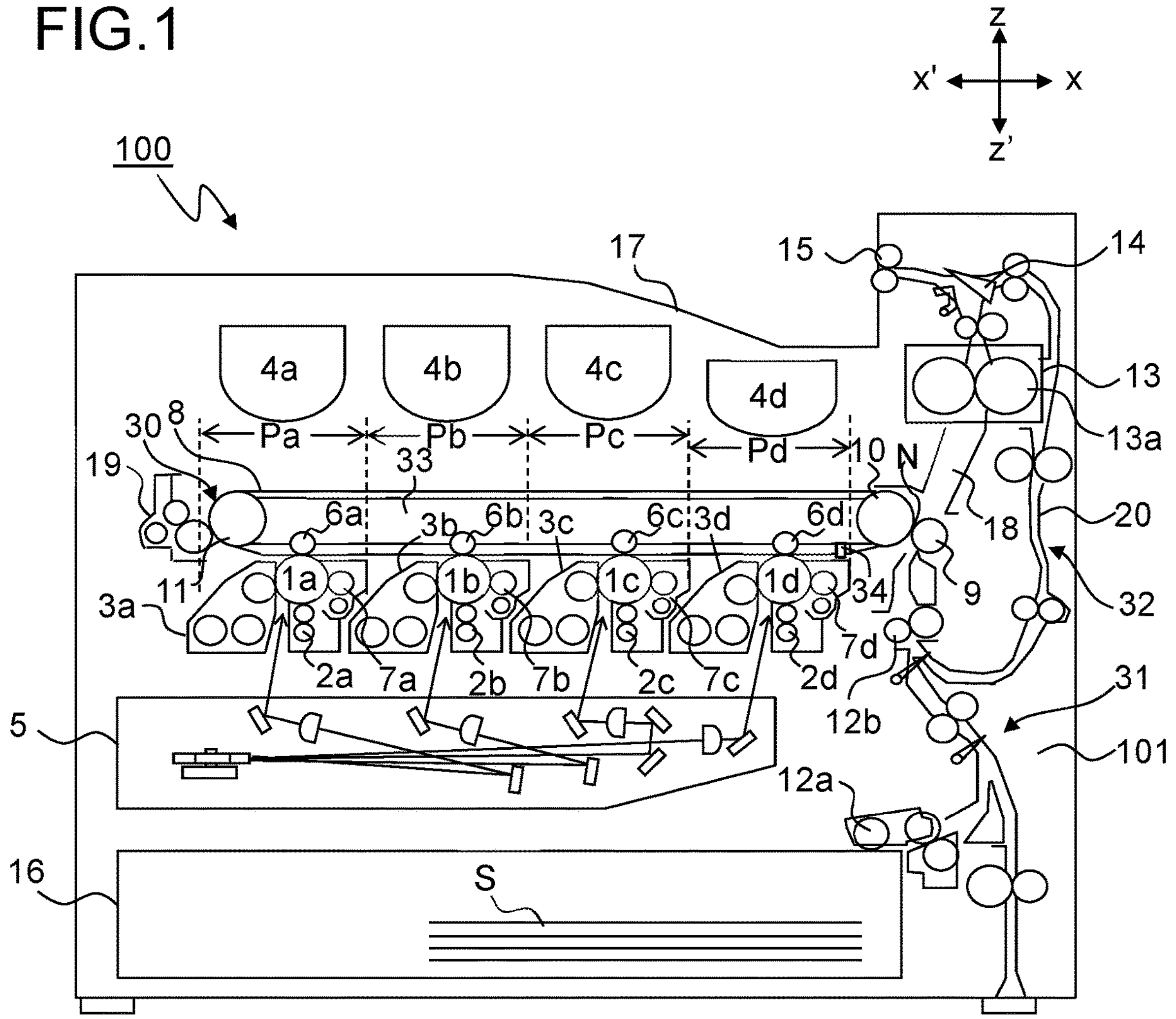
FIG. 1 is a schematic view illustrating a configuration of an image forming apparatus including an intermediate transfer unit according to the present disclosure.
Figure 2:
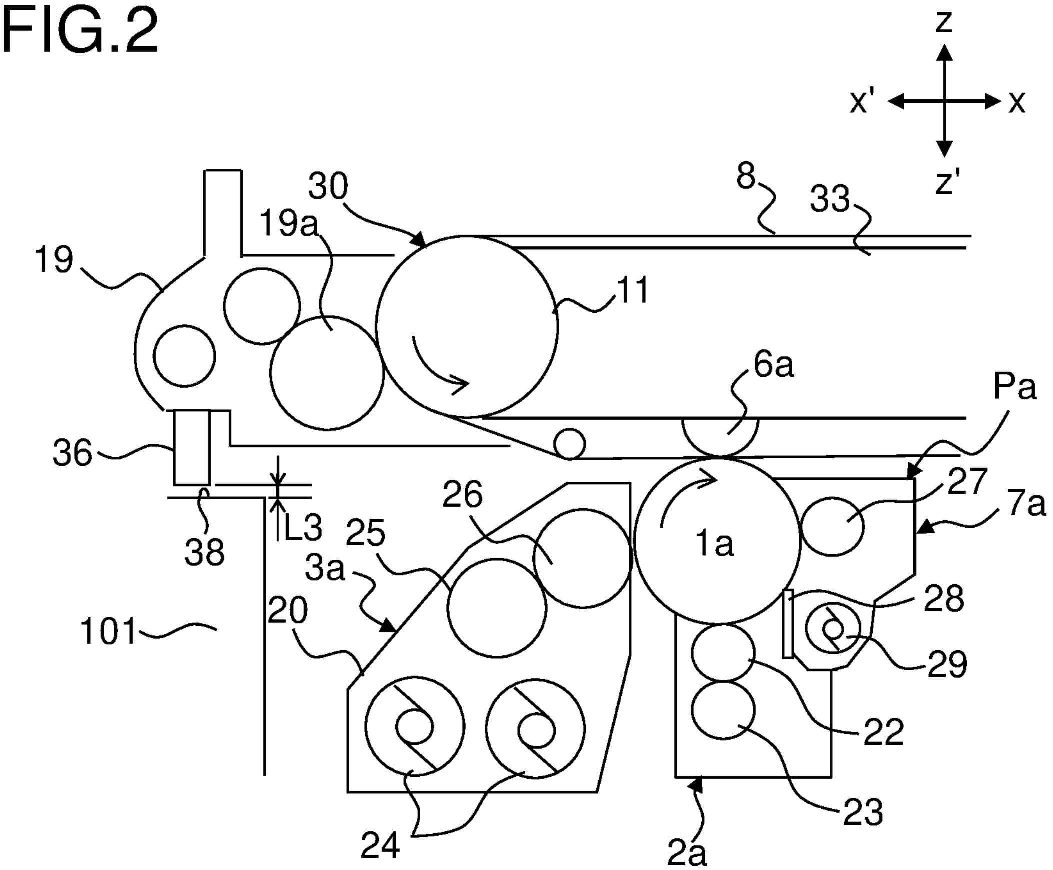
FIG. 2 is an enlarged view of a vicinity of an image forming section in FIG. 1.

Now, an embodiment of the present disclosure is described with reference to the drawings. First, an overall configuration of an image forming apparatus 100 according to this embodiment is described. FIG. 1 is a schematic view illustrating a configuration of the image forming apparatus 100 including an intermediate transfer unit 30 according to the present disclosure. FIG. 2 is an enlarged view of a vicinity of an image forming section Pa in FIG. 1.

As illustrated in FIG. 1, the image forming apparatus 100 includes the image forming section Pa, an image forming section Pb, an image forming section Pc, and an image forming section Pd, an exposure unit 5, the intermediate transfer unit 30, a secondary transfer roller 9, a belt cleaning unit 19, a sheet feeding section 31, a sheet conveying section 32, and a fixing section 13.

The image forming sections Pa to Pd are each a unit (that is, image-bearing-member unit) including a plurality of components that perform steps (steps of charging, exposure, development, and transfer). Through these steps, the image forming sections Pa to Pd form images in respective colors (cyan, magenta, yellow, and black) sequentially onto an outer peripheral surface of an intermediate transfer belt 8.

The image forming sections Pa to Pd are provided in a main body of the image forming apparatus 100 (hereinafter, abbreviated as "apparatus main body 101"). The image forming sections Pa to Pd can be installed into and removed from the apparatus main body 101. A direction in which the image forming sections Pa to Pd are installed into the apparatus main body 101 (installation direction) is a direction that extends from a near side to a depth side along a direction that is perpendicular to the drawing sheet of FIG. 1. A direction in which the image forming sections Pa to Pd are removed from the apparatus main body 101 is a direction that is opposite to the installation direction.

The image forming sections Pa to Pd are arrayed sequentially from an upstream side in a belt moving direction of the intermediate transfer belt 8 described below (side indicated by an arrow x' in FIG. 1). The image forming sections Pa to Pd each form images in a corresponding one of the four different colors (cyan, magenta, yellow, and black).

Note that, the image forming sections Pa to Pd basically have a common configuration. Thus, herein, only the image forming section Pa is described, and components of the other image forming sections Pb to Pd are denoted by common reference symbols (reference symbols including numbers that are changed in alphabetical suffixes "a" to "d" in accordance with to which of the image forming sections Pa to Pd the components correspond) to omit redundant description.

As illustrated in FIG. 1 and FIG. 2, the image forming section Pa includes a photosensitive drum 1*a* (image bearing member), a charger 2*a*, a developing unit 3*a*, and a cleaning device 7*a*.

The photosensitive drum 1*a* is supported to be rotatable. A rotation axis of the photosensitive drum 1*a* is orthogonal to a direction in which the image forming sections Pa to Pd are arrayed (the belt moving direction, that is, a direction indicated by arrows x-x') and to an upper-and-lower direction (direction indicated by arrows z-z'). The photosensitive drum 1*a* bears a toner image (visible image) on its outer peripheral surface.

The charger 2*a* charges the photosensitive drum 1*a*. More specifically, the charger 2*a* includes a charging roller 22 and a charging cleaning roller 23.

The charging roller 22 is held in contact with the photosensitive drum 1*a*. The charging roller 22 applies a charging bias to the outer peripheral surface (a drum surface) of the photosensitive drum 1*a*. The charging cleaning roller 23 comes into contact with the charging roller 22, and cleans the charging roller 22.

The developing unit 3*a* is connected to a toner container 4*a* via a replenishing device (not shown). The toner container 4*a*, a toner container 4*b*, a toner container 4*c*, and a toner container 4*d* each store toner in a corresponding one of the colors (cyan, magenta, yellow, and black). A predetermined amount of the toner is supplied from the toner container 4*a* to the developing unit 3*a* via the replenishing device.

The developing unit 3*a* forms a toner image on the photosensitive drum 1*a*. More specifically, the developing unit 3*a* includes a pair of stirring-and-conveying screws 24, a magnetic roller 25, and a developing roller 26.

The pair of stirring-and-conveying screws 24 are supported to be rotatable at a position below the magnetic roller 25. The stirring-and-conveying screws 24 supply the toner to the developing roller 26 while stirring and conveying the toner. The magnetic roller 25 applies a developing bias with the same polarity (positive) as that of the toner to the developing roller 26. With use of the developing bias, the developing roller 26 splashes and supplies the toner onto the drum surface of the photosensitive drum 1*a*.

The cleaning device 7*a* removes residual developer (toner) on the photosensitive drum 1*a*. More specifically, the cleaning device 7*a* includes a rubbing roller 27, a cleaning blade 28, and a recovery screw 29.

The rubbing roller 27 is held in press contact at predetermined pressure with the photosensitive drum 1*a*. By drive means (not shown), the rubbing roller 27 is driven to rotate in the same direction as that of the photosensitive drum 1*a* with their surfaces abutting against each other. A peripheral speed of the rubbing roller 27 while being driven to rotate is controlled to be higher than a peripheral speed of the photosensitive drum 1*a*.

The cleaning blade 28 is held in abutment against a part on a downstream side in a direction of the rotation relative to a part abutting against the rubbing roller 27 among parts of the surface of the photosensitive drum 1*a*. The rubbing roller 27 and the cleaning blade 28 remove the residual toner on the surface of the photosensitive drum 1*a*.

The recovery screw 29 is supported to be rotatable at a position below (on a side indicated by an arrow z' relative to) a contact point between the rubbing roller 27 and the photosensitive drum 1*a*, and a contact point between the cleaning blade 28 and the photosensitive drum 1*a*. The recovery screw 29 is rotated to convey the toner removed from the photosensitive drum 1*a* by the rubbing roller 27 and the cleaning blade 28 into a toner recovery container (not shown).

The exposure unit 5 exposes the photosensitive drum 1*a*, a photosensitive drum 1*b*, a photosensitive drum 1*c*, and a photosensitive drum 1*d* to image information.

The intermediate transfer unit 30 is installed in the apparatus main body 101. The intermediate transfer unit 30 can be installed into and removed from the apparatus main body 101. The intermediate transfer unit 30 is installed into and removed from the apparatus main body 101 in a direction parallel to a direction of the rotation axis of the photosensitive drum 1*a*. More specifically, a direction in which the intermediate transfer unit 30 is installed into the apparatus main body 101 is the direction that extends from the near side to the depth side along the direction that is perpendicular to the drawing sheet of FIG. 1 (a direction from a side indicated by an arrow y' toward a side indicated by an arrow y in FIG. 5 and FIG. 6). A direction in which the intermediate transfer unit 30 is removed from the apparatus main body 101 is a direction that is opposite to the installation direction. Herein, basically, the intermediate transfer unit 30 that has been installed in the apparatus main body 101 is described.

The intermediate transfer unit 30 includes a frame 33, a drive roller 10, a driven roller 11 (tension roller), the intermediate transfer belt 8, and a primary transfer roller 6*a*, a primary transfer roller 6*b*, a primary transfer roller 6*c*, and a primary transfer roller 6*d*.

The frame 33 is formed to be elongated along a horizontal direction (the direction in which the image forming sections Pa to Pd are arrayed, that is, the direction indicated by the arrows x-x') The frame 33 is located above the photosensitive drums 1*a* to 1*d*.

The drive roller 10 is supported to be rotatable at one end of the frame 33 (at an end portion on a side where a sheet conveying path 18 described below is present) in the horizontal direction (direction indicated by the arrows x-x'). The driven roller 11 is supported to be rotatable at another end of the frame 33 in the horizontal direction. The drive roller 10 is connected to a drive source (not shown) such as a motor. The drive roller 10 is rotated by driving force of this drive source.

The intermediate transfer belt 8 is formed of a sheet made of a dielectric resin. A seamless belt is preferably employed as the intermediate transfer belt 8. The intermediate transfer belt 8 is fitted to surround the frame 33. In other words, the frame 33 is arranged inside the intermediate transfer belt 8.

The intermediate transfer belt 8 is looped around the drive roller 10 and the driven roller 11. The intermediate transfer belt 8 is adjacent to the image forming sections Pa to Pd in the upper-and-lower direction (direction indicated by the arrows z-z'). The outer peripheral surface of the intermediate transfer belt 8 is held in abutment against the outer peripheral surface of the photosensitive drum 1*a* and outer peripheral surfaces of the photosensitive drums 1*b* to 1*d* under a state in which the primary transfer rollers 6*a* to 6*d* described below each have come to a transfer position P1.

An outer peripheral surface of the drive roller 10 is held in abutment against an inner peripheral surface of the intermediate transfer belt 8. The drive roller 10 rotates the intermediate transfer belt 8. An outer peripheral surface of the driven roller 11 is held in abutment against the inner peripheral surface of the intermediate transfer belt 8, and applies predetermined tension to the intermediate transfer belt 8. The driven roller 11 is rotated along with the rotation of the intermediate transfer belt 8.

A direction in which a lower surface of the intermediate transfer belt 8 moves along with the rotation of the intermediate transfer belt 8 (direction that extends from the side indicated by the arrow x' to a side indicated by an arrow x in FIG. 1) is referred to as a “belt moving direction.” Thus, the photosensitive drum 1*a* is located on the upstream side in the belt moving direction, and the photosensitive drum 1*d* is located on a downstream side in the belt moving direction. In addition, a direction that is orthogonal to the belt moving direction and the upper-and-lower direction (the direction that is perpendicular to the drawing sheet of FIG. 1, that is, a direction indicated by arrows y-y' in FIG. 5 and FIG. 6) is referred to as a “belt width direction.” In the drawings, the belt moving direction is represented by the arrows x-x', the belt width direction is represented by the arrows y-y', and the upper-and-lower direction is represented by the arrows z-z'.

The primary transfer rollers 6*a* to 6*d* are supported to be rotatable by the frame 33, and the primary transfer rollers 6*a* to 6*d* are arrayed at a predetermined interval in the belt moving direction (a longitudinal direction of the frame 33). The primary transfer rollers 6*a* to 6*d* are at positions respectively overlapping with the photosensitive drums 1*a* to 1*d* in the belt moving direction. More specifically, in the belt moving direction, the primary transfer roller 6*a* and the photosensitive drum 1*a* overlap with each other, the primary transfer roller 6*b* and the photosensitive drum 1*b* overlap with each other, the primary transfer roller 6*c* and the photosensitive drum 1*c* overlap with each other, and the primary transfer roller 6*d* and the photosensitive drum 1*d* overlap with each other.

The primary transfer rollers 6*a* to 6*d* are driven to rotate by primary-transfer drive motors (not shown) at the same linear velocity as those of the photosensitive drums 1*a* to 1*d* and the intermediate transfer belt 8.

Figure 3:
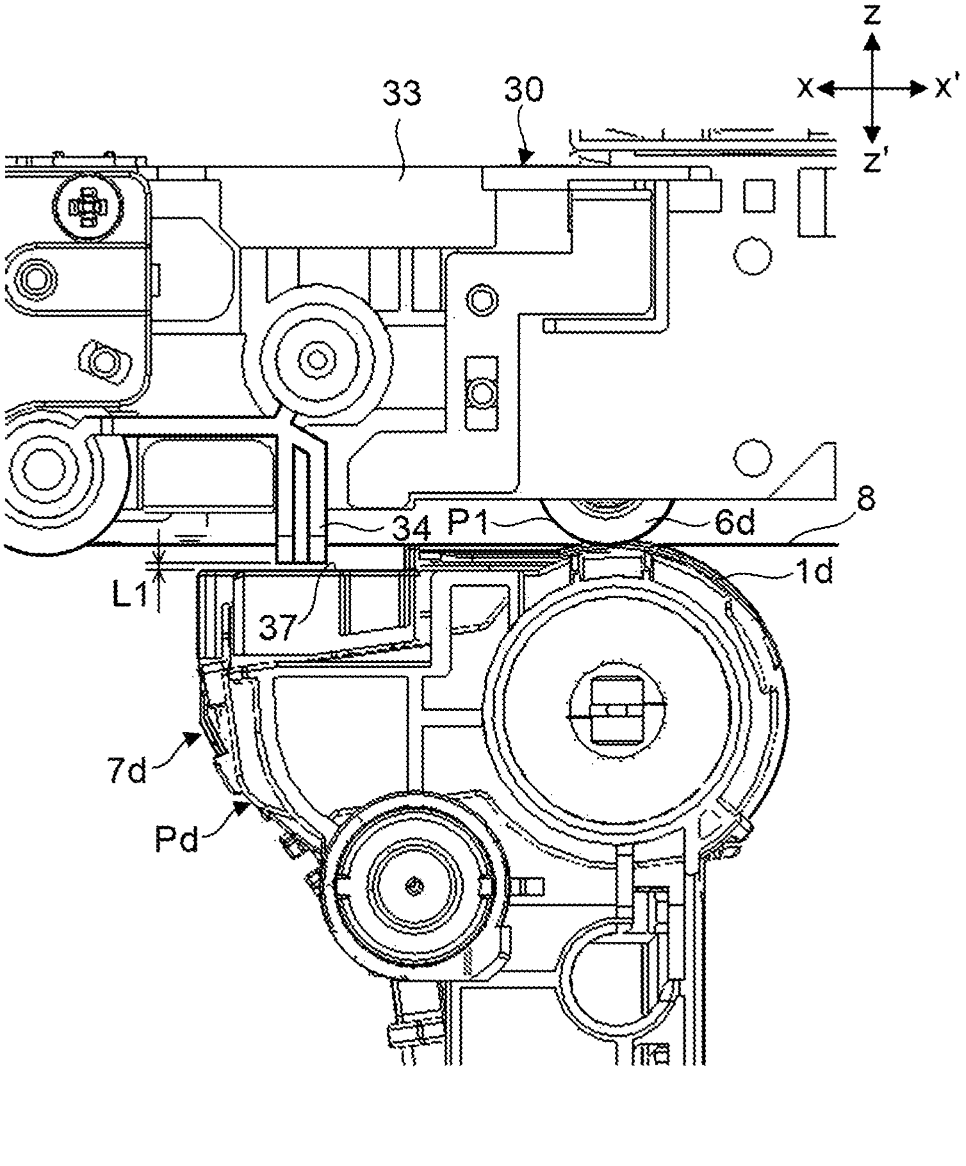
FIG. 3 is an enlarged view of a vicinity of a primary transfer roller that has come to a transfer position.
Figure 4:
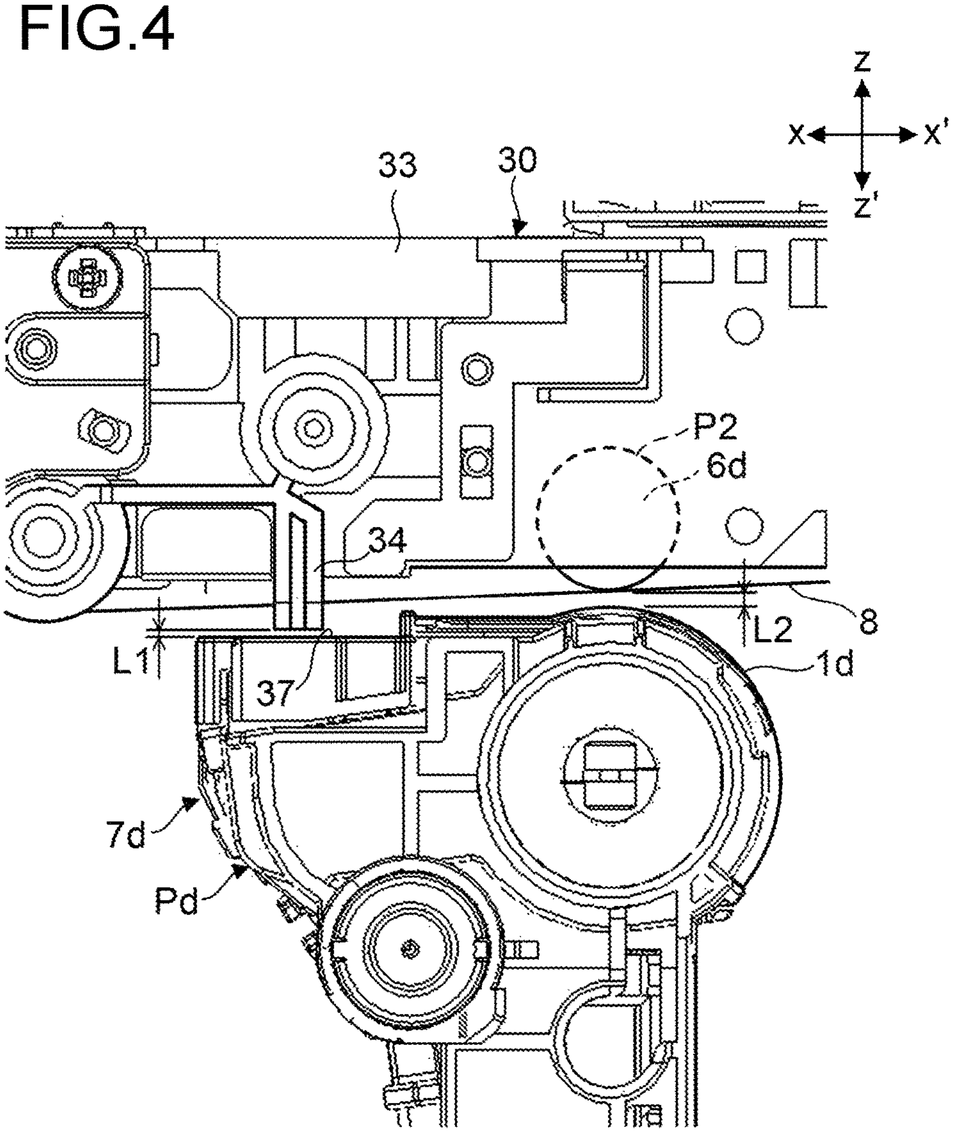
FIG. 4 is an enlarged view of the vicinity of the primary transfer roller that has come to a retractive position.

FIG. 3 is an enlarged view of a vicinity of the primary transfer roller 6*d* that has come to the transfer position P1. FIG. 4 is an enlarged view of the vicinity of the primary transfer roller 6*d* that has come to a retractive position P2. Note that, although the primary transfer rollers 6*a* to 6*c* are not illustrated in FIG. 3 and FIG. 4, configurations of the primary transfer rollers 6*a* to 6*c* can be regarded as the same as a configuration of the primary transfer roller 6*d*.

As illustrated in FIG. 3 and FIG. 4, the primary transfer rollers 6*a* to 6*d* are each movable parallel to the upper-and-lower direction (direction that is perpendicular to the longitudinal direction of the frame 33) between the transfer position P1 and the retractive position P2.

The transfer position P1 is a position (position illustrated in FIG. 1 to FIG. 3) at which the primary transfer rollers 6*a* to 6*d* respectively transfer (primarily transfer) the toner images borne on the outer peripheral surfaces of the photosensitive drums 1*a* to 1*d* onto the intermediate transfer belt 8. At the transfer position P1, the primary transfer rollers 6*a* to 6*d* are held in abutment against the inner peripheral surface of the intermediate transfer belt 8, and press the photosensitive drums 1*a* to 1*d* with the intermediate transfer belt 8 sandwiched therebetween. In this state, the primary transfer rollers 6*a* to 6*d* apply predetermined transfer voltage to between the primary transfer rollers 6*a* to 6*d* and the photosensitive drums 1*a* to 1*d*.

The retractive position P2 is a position (position illustrated in FIG. 4) to which the primary transfer rollers 6*a* to 6*d* that have been separated together with the intermediate transfer belt 8 from the photosensitive drums 1*a* to 1*d* come. Under a state in which the primary transfer rollers 6*a* to 6*d* have come to the retractive position P2, the intermediate transfer unit 30 is installed into and removed from the apparatus main body 101. The primary transfer rollers 6*a* to 6*d* move upward (in a direction indicated by an arrow z) from the transfer position P1 to the retractive position P2.

Referring back to FIG. 1, the secondary transfer roller 9 faces the intermediate transfer belt 8. The secondary transfer roller 9 is supported to be rotatable. The secondary transfer roller 9 presses the drive roller 10 with the intermediate transfer belt 8 sandwiched therebetween. The secondary transfer roller 9 forms a secondary transfer nip N by being held in press contact with the intermediate transfer belt 8. The secondary transfer roller 9 transfers (secondarily transfers) the toner images formed on the intermediate transfer belt 8 onto sheets S (recording media such as sheets to be printed, envelopes, postcards, or overhead transparencies) that pass through the secondary transfer nip N.

As illustrated in FIG. 1 and FIG. 2, the belt cleaning unit 19 is arranged at a position on a downstream side relative to the secondary transfer nip N in a direction of the rotation of the intermediate transfer belt 8 (a counterclockwise direction illustrated in FIG. 1), and on an upstream side relative to the photosensitive drum 1*a*. The belt cleaning unit 19 is joined to the frame 33.

The belt cleaning unit 19 includes a belt cleaning roller 19*a*. The belt cleaning roller 19*a* is held in abutment against the outer peripheral surface of the intermediate transfer belt 8, and removes, for example, residual toner on the surface of the intermediate transfer belt 8.

As illustrated in FIG. 1, the sheet feeding section 31 feeds the sheets S into the secondary transfer nip N. More specifically, the sheet feeding section 31 includes a sheet cassette 16, a sheet feeding roller 12*a*, and a registration roller pair 12*b*.

The sheet cassette 16 is provided in a lower section of the apparatus main body 101. The sheet cassette 16 is capable of storing the plurality of sheets S. The sheet feeding roller 12*a* is provided on a downstream side relative to the sheet cassette 16 in a conveying direction of the sheets S. The sheet feeding roller 12*a* feeds the sheets S stored in the sheet cassette 16 to the downstream side.

The registration roller pair 12*b* is arranged on a downstream side relative to the sheet feeding roller 12*a* in the sheet conveying direction. The registration roller pair 12*b* conveys, at a predetermined timing, the sheets S fed by the sheet feeding roller 12*a* into the secondary transfer nip N.

As illustrated in FIG. 1, the sheet conveying section 32 includes the sheet conveying path 18, a branch portion 14, a reverse conveying path 20, and a discharge roller pair 15.

The sheet conveying path 18 is a path through which the sheets S fed by the registration roller pair 12*b* pass. One end of the sheet conveying path 18 is located on a downstream side relative to the registration roller pair 12*b*. Another end of the sheet conveying path 18 is opened to an outside of the apparatus main body 101. The sheet conveying path 18 extends upward from the one end to the other end. The discharge roller pair 15 is provided at the other end of the sheet conveying path 18. The discharge roller pair 15 discharges the sheets S that pass through the sheet conveying path 18 onto a discharge tray 17 formed on an upper surface of the apparatus main body 101.

The reverse conveying path 20 branches from the sheet conveying path 18 and extends downward. One end of the reverse conveying path 20 is connected to the sheet conveying path 18. Another end of the reverse conveying path 20 is provided at a position on the upstream side relative to the registration roller pair 12*b*. The reverse conveying path 20 conveys the sheets S that pass through the sheet conveying path 18 again to the registration roller pair 12*b*.

The branch portion 14 is provided at a connecting part between the sheet conveying path 18 and the reverse conveying path 20. The branch portion 14 routes the sheets S that pass through the sheet conveying path 18 to either one of a side where the discharge roller pair 15 is present and a side where the reverse conveying path 20 is present.

As illustrated in FIG. 1, the fixing section 13 includes a fixing roller pair 13*a*. In the fixing section 13, the fixing roller pair 13*a* nips, heats, and presses the sheets S that have passed through the secondary transfer nip N. With this, the toner images are fixed to surfaces of the sheets S.

<Procedure of Image Formation>

Next, a procedure of the image formation in the image forming apparatus 100 is described. In response to input of a start of the image formation by a user, first, the surfaces of the photosensitive drums 1*a* to 1*d* are uniformly charged with the charger 2*a*, a charger 2*b*, a charger 2*c*, and a charger 2*d*. Then, the exposure unit 5 irradiates the surfaces of the photosensitive drums 1*a* to 1*d* with light. With this, electrostatic latent images corresponding to image signals are formed on the photosensitive drums 1*a* to 1*d*.

Next, the developing unit 3*a*, a developing unit 3*b*, a developing unit 3*c*, and a developing unit 3*d* supply toner onto the photosensitive drums 1*a* to 1*d*. Then, the toner electrostatically adheres onto the photosensitive drums 1*a* to 1*d*. In this way, toner images in accordance with the electrostatic latent images formed on the photosensitive drums 1*a* to 1*d* are formed.

Then, by the primary transfer rollers 6*a* to 6*d*, an electric field with the predetermined transfer voltage is applied to between the primary transfer rollers 6*a* to 6*d* and the photosensitive drums 1*a* to 1*d*. At this time, the drive roller 10 is rotated to cause the intermediate transfer belt 8 to be rotated along with this rotation of the drive roller 10. With this, the lower surface of the intermediate transfer belt 8 moves in abutment against the outer peripheral surfaces of the photosensitive drums 1*a* to 1*d*. In this way, the toner images formed on the photosensitive drums 1*a* to 1*d* are sequentially transferred (primarily transferred) onto the intermediate transfer belt 8. After that, the cleaning device 7*a*, a cleaning device 7*b*, a cleaning device 7*c*, and a cleaning device 7*d* remove the residual toner on the surfaces of the photosensitive drums 1*a* to 1*d*.

The sheet feeding roller 12*a* feeds the sheets S from the sheet cassette 16. The registration roller pair 12*b* conveys, at the predetermined timing, the sheets S fed by the sheet feeding roller 12*a* into the secondary transfer nip N. In the secondary transfer nip N, the sheets S are held in press contact with the intermediate transfer belt 8 by being nipped between the secondary transfer roller 9 and the intermediate transfer belt 8. With this, the toner images (images) in the respective colors, the toner images having been formed on the intermediate transfer belt 8, are transferred (secondarily transferred) onto the sheets S.

The sheets S to which the toner images have been transferred are conveyed to the fixing section 13 through the sheet conveying path 18. At this time, the belt cleaning unit

19 removes the residual toner on the surface of the intermediate transfer belt 8 after the transfer onto the sheets S.

The fixing section 13 fixes the toner images onto the surfaces of the sheets S. With this, predetermined full-color images are formed on the sheets S. The conveying direction of the sheets S on which the full-color images have been formed is switched by the branch portion 14. If the images are formed on only one sides of the sheets S, the sheets S are routed as normal to the side where the discharge roller pair 15 is present, and then discharged onto the discharge tray 17.

Meanwhile, in order that the images are formed on both sides of the sheets S, the sheets S that have passed through the fixing section 13 are routed by the branch portion 14 to the side where the reverse conveying path 20 is present. More specifically, a part of the sheet S is temporarily protruded through the discharge roller pair 15 to the outside of the image forming apparatus 100, and in this state, the discharge roller pair 15 is reversely rotated. With this, while guided to the reverse conveying path 20 by the branch portion 14, the sheet S is conveyed into the reverse conveying path 20 by the discharge roller pair 15. The sheet S is conveyed again into the secondary transfer nip N under a state in which an image surface (surface to which the toner image has been fixed) is flipped over. Next, a subsequent one of the toner images formed on the intermediate transfer belt 8 is transferred onto another surface on which no image has been formed among the surfaces of the sheet S, and then is fixed by the fixing section 13. After that, the sheet S is discharged onto the discharge tray 17.

<Configuration Relating to Suppression of Contact Between Intermediate Transfer Belt and Photosensitive Drums>

Figure 5:
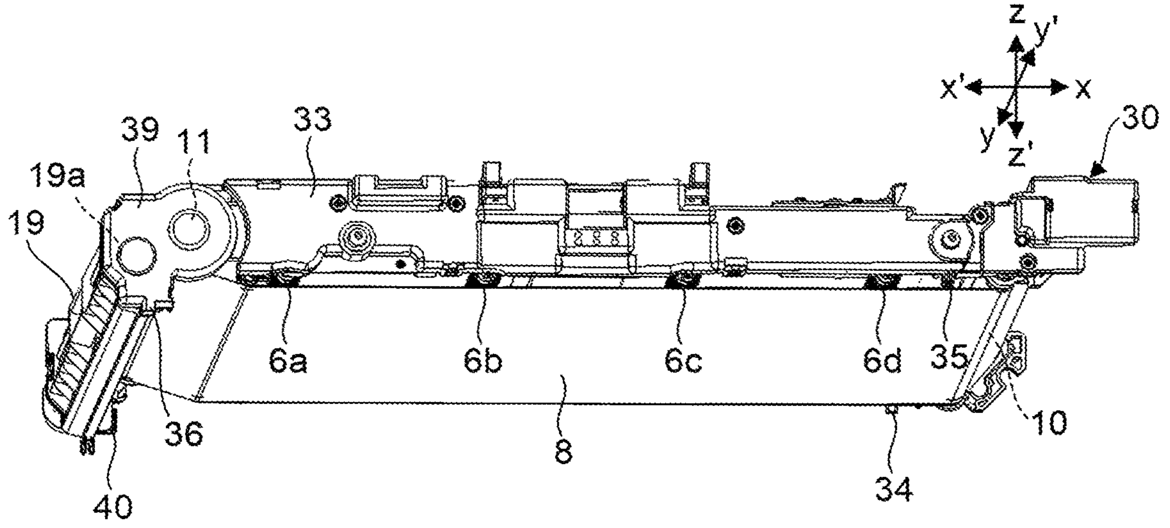
FIG. 5 is a perspective view of the intermediate transfer unit as viewed from a side where a lower surface of an intermediate transfer belt is present.
Figure 6:
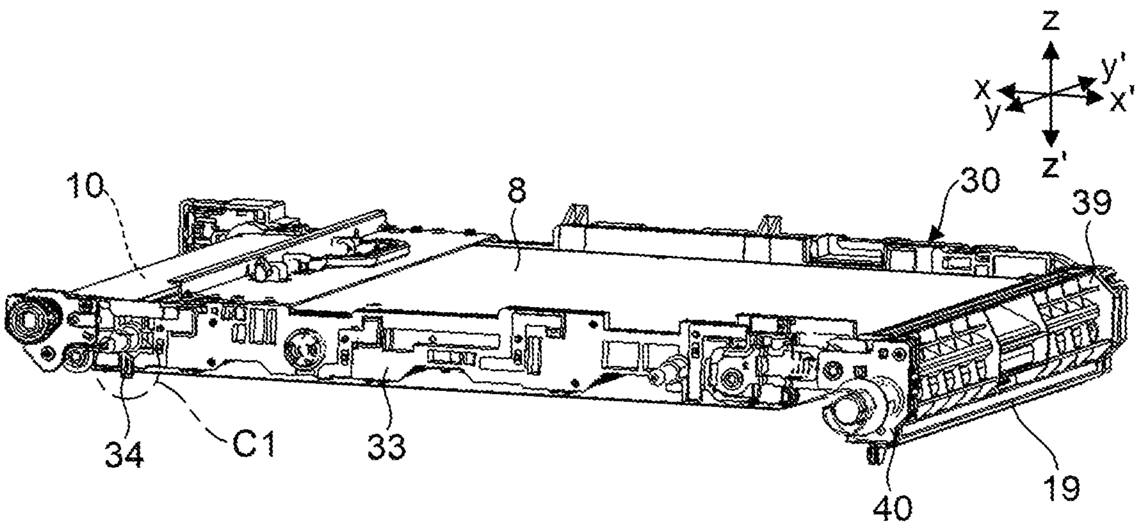
FIG. 6 is a perspective view of the intermediate transfer unit as viewed from a side where an upper surface of the intermediate transfer belt is present.
Figure 7:
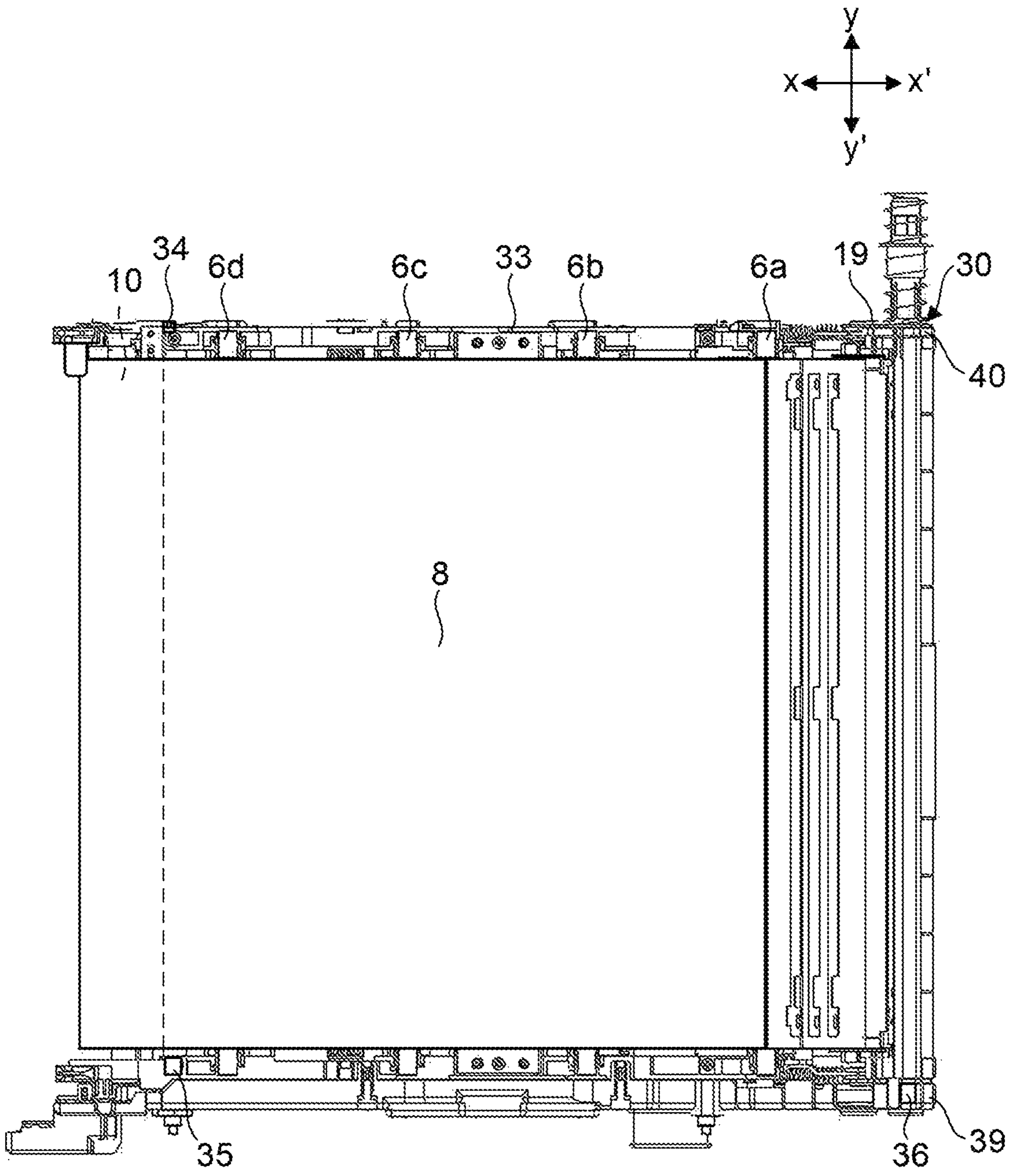
FIG. 7 is a plan view of the intermediate transfer unit as viewed from the side where the lower surface of the intermediate transfer belt is present.
Figure 8:
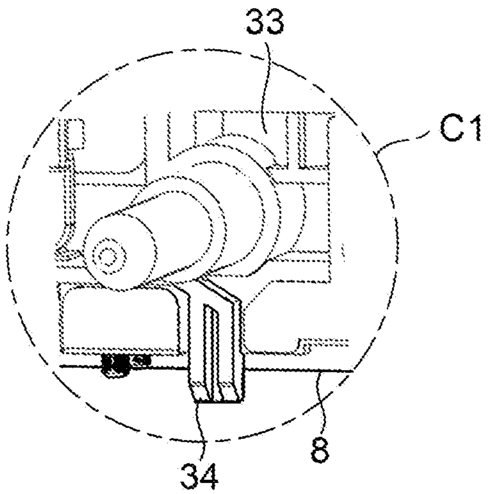
FIG. 8 is an enlarged perspective view of a part encircled by a dash-dotted line in FIG. 6.

Next, the intermediate transfer unit 30 and the image forming sections Pa to Pd are described in detail. FIG. 5 is a perspective view of the intermediate transfer unit 30 as viewed from a side where the lower surface of the intermediate transfer belt 8 is present (the side indicated by the arrow z'). FIG. 6 is a perspective view of the intermediate transfer unit 30 as viewed from a side where an upper surface of the intermediate transfer belt 8 is present (side indicated by the arrow z). FIG. 7 is a plan view of the intermediate transfer unit 30 as viewed from the side where the lower surface of the intermediate transfer belt 8 is present (side indicated by the arrow z'). FIG. 8 is an enlarged perspective view of a part encircled by a dash-dotted line C1 in FIG. 6.

As illustrated in FIG. 3 to FIG. 7, the frame 33 includes cleaning-roller support portions 39 and 40, a first protrusion 34, a second protrusion 35, and a third protrusion 36. The cleaning-roller support portions 39 and 40 support the belt cleaning roller 19*a* in a manner that allows the belt cleaning roller 19*a* to be rotated. The cleaning-roller support portions 39 and 40 are located at an end portion on a side (the side indicated by the arrow x') that is opposite to a side where the drive roller 10 is present in the belt moving direction among sides of the frame 33. The cleaning-roller support portions 39 and 40 are located on one side and another side relative to the intermediate transfer belt 8 therebetween in the belt width direction.

The first protrusion 34 is provided at a position on an outside in the belt width direction of the intermediate transfer belt 8 among positions on the frame 33. The first protrusion 34 is formed integrally with the frame 33. The first protrusion 34 is located on one side (the side where the drive roller 10 is present, that is, the side indicated by the arrow x) in the belt moving direction among sides of the image forming section Pd (more specifically, photosensitive drum 1*d*) (refer to FIG. 1). In other words, the first protrusion 34 is located on one side (the side indicated by the arrow x) in the belt moving direction among sides of the primary transfer roller 6*d*.

The first protrusion 34 extends downward (in a direction indicated by the arrow z') from the frame 33. The first protrusion 34 protrudes to a side where the photosensitive drums 1*a* to 1*d* are present (the side indicated by the arrow z') relative to the outer peripheral surface of the intermediate transfer belt 8 (lower surface of the intermediate transfer belt 8) (refer to FIG. 3 and FIG. 8).

The second protrusion 35 is provided on a side that is opposite to a side where the first protrusion 34 is present relative to the intermediate transfer belt 8 therebetween in the belt width direction among the sides of the frame 33. The second protrusion 35 is formed integrally with the frame 33. The second protrusion 35 is at a position aligned with the first protrusion 34 in the belt moving direction. The second protrusion 35 is located on an outside in the belt moving direction of the photosensitive drums 1*a* to 1*d* (not shown). Specifically, the second protrusion 35 is located on the one side (side where the drive roller 10 is present, that is, side indicated by the arrow x) in the belt moving direction among the sides of the image forming section Pd (more specifically, photosensitive drum 1*d*) (not shown). In other words, the second protrusion 35 is located on the one side (side indicated by the arrow x) in the belt moving direction among the sides of the primary transfer roller 6*d* (refer to FIG. 5).

The second protrusion 35 extends downward (in the direction indicated by the arrow z') from the frame 33. The second protrusion 35 protrudes to the side where the photosensitive drums 1*a* to 1*d* are present (side indicated by the arrow z') relative to the outer peripheral surface of the intermediate transfer belt 8 (lower surface of the intermediate transfer belt 8).

The third protrusion 36 is provided on the side that is opposite to the side where the first protrusion 34 is present relative to the intermediate transfer belt 8 therebetween in the belt width direction. More specifically, the third protrusion 36 is provided to the cleaning-roller support portion 39. The third protrusion 36 is formed integrally with the frame 33 (more specifically, with cleaning-roller support portion 39).

The third protrusion 36 is located on a side that is opposite to a side where the second protrusion 35 is present relative to a center of the frame 33 therebetween in the belt moving direction among the sides of the frame 33. The third protrusion 36 is located on the outside in the belt moving direction of the image forming sections Pa to Pd (refer to FIG. 1 and FIG. 2). Specifically, the third protrusion 36 is located on another side (a side where the driven roller 11 is present, that is, the side indicated by the arrow x') in the belt moving direction among sides of the image forming section Pa (refer to FIG. 1). More specifically, the third protrusion 36 is located on another side (the side where the driven roller 11 is present, that is, the side indicated by the arrow x') in the belt moving direction among sides of the photosensitive drum 1*a* (refer to FIG. 2). In other words, the third protrusion 36 is located on another side (the side indicated by the arrow x') in the belt moving direction among sides of the primary transfer roller 6*a* (refer to FIG. 5).

The third protrusion 36 extends downward (in the direction indicated by the arrow z') from the frame 33 (more specifically, from cleaning-roller support portion 39). The third protrusion 36 protrudes to the side where the photosensitive drums 1*a* to 1*d* are present (side indicated by the arrow z') relative to the outer peripheral surface of the intermediate transfer belt 8 (lower surface of the intermediate transfer belt 8) (refer to FIG. 2).

Referring back to FIG. 3 and FIG. 4, the image forming section Pd includes a first regulating guide 37. The first regulating guide 37 is formed at an upper end portion of the cleaning device 7*d*. The first regulating guide 37 is a flat surface that faces the intermediate transfer belt 8 in the upper-and-lower direction. The first regulating guide 37 extends in the direction of the rotation axis of the photosensitive drum 1*d*.

The first regulating guide 37 faces the first protrusion 34 in the upper-and-lower direction. As illustrated in FIG. 3 and FIG. 4, a length L1 in the upper-and-lower direction between the first regulating guide 37 and a distal end of the first protrusion 34 is smaller than a length L2 between the intermediate transfer belt 8 and each of the photosensitive drums 1*a* to 1*d* under the state in which the primary transfer rollers 6*a* to 6*d* have come to the retractive position P2 and in which the intermediate transfer belt 8 has been separated from the photosensitive drums 1*a* to 1*d*.

Figure 9:
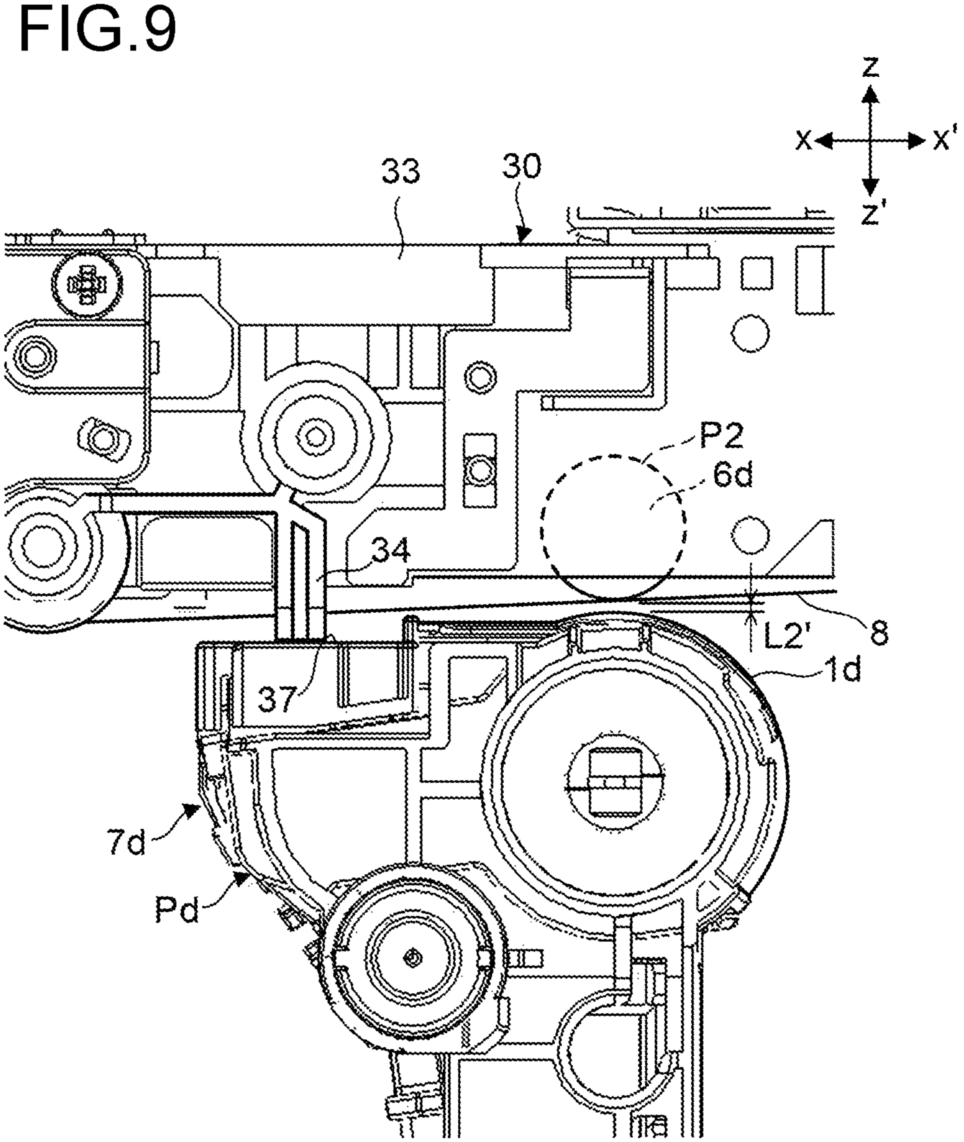
FIG. 9 is an enlarged view of a vicinity of an image forming section under a state in which a first protrusion and a first regulating guide are held in contact with each other, and in which the primary transfer roller has come to the retractive position.

In other words, as described below with reference to FIG. 9, under a state in which the intermediate transfer unit 30 has been removed from the apparatus main body 101, in which the first protrusion 34 and the first regulating guide 37 are held in contact with each other, and in which the primary transfer rollers 6*a* to 6*d* have come to the retractive position P2, the intermediate transfer belt 8 and the photosensitive drums 1*a* to 1*d* face (are separated from) each other with a predetermined length L2' therebetween.

At a time of installing the intermediate transfer unit 30 into the apparatus main body 101, the intermediate transfer unit 30 is moved along the belt width direction with the first protrusion 34 held in abutment against the first regulating guide 37. With this, the first regulating guide 37 guides the intermediate transfer unit 30 to an installation position in the apparatus main body 101.

Referring back to FIG. 2, the apparatus main body 101 includes a second regulating guide 38. The second regulating guide 38 is located in the apparatus main body 101. The second regulating guide 38 extends along the axial direction of the photosensitive drum 1*a* to 1*d*. The second regulating guide 38 faces the third protrusion 36 with a predetermined length therebetween in the upper-and-lower direction. This length L3 in the upper-and-lower direction between the second regulating guide 38 and the third protrusion 36 is smaller than the above-described length L2.

In other words, under a state in which the intermediate transfer unit 30 has been removed from the apparatus main body 101, in which the third protrusion 36 and the second regulating guide 38 are held in contact with each other, and in which the primary transfer rollers 6*a* to 6*d* have come to the retractive position P2, the intermediate transfer belt 8 and the photosensitive drums 1*a* to 1*d* face (are separated from) each other with the predetermined length therebetween (not shown).

Figure 10:
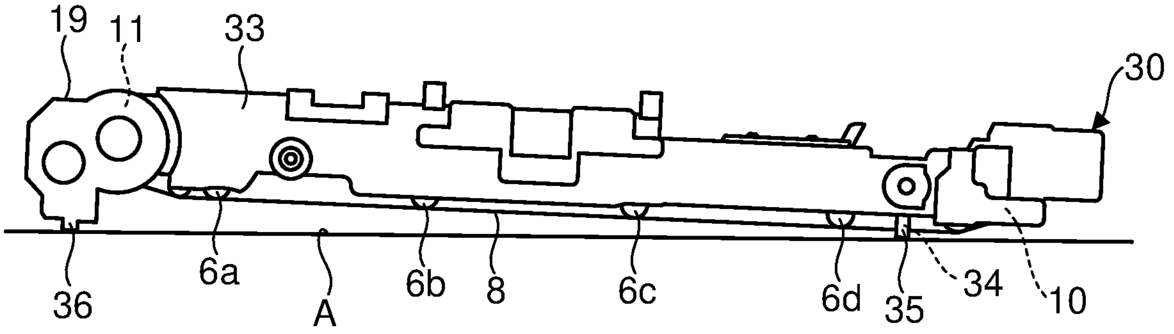
FIG. 10 is a side view of the intermediate transfer unit that has been removed from an apparatus main body and placed on a predetermined placement surface.

FIG. 10 is a side view of the intermediate transfer unit 30 that has been removed from the apparatus main body 101 and placed on a predetermined placement surface A. As illustrated in FIG. 10, the distal end of the first protrusion 34, a distal end of the second protrusion 35, and a distal end of the third protrusion 36 are located in the same plane (on placement surface A in the illustration). In this state, the lower surface of the intermediate transfer belt 8 is located above the placement surface A. In other words, in this state, the intermediate transfer belt 8 is away from the placement surface A.

The image forming apparatus 100 according to the above-described embodiment is capable of suppressing the intermediate transfer belt 8 from coming into contact with the photosensitive drums 1*a* to 1*d* at the times of operations to install/remove the intermediate transfer unit 30 into/from the apparatus main body 101. More specifically, at the times when the intermediate transfer unit 30 is installed into and removed from the apparatus main body 101, even if the intermediate transfer unit 30 comes close to the image forming sections Pa to Pd to bring the first protrusion 34 and the first regulating guide 37 into contact with each other, the predetermined length L2' measures between the intermediate transfer belt 8 and the photosensitive drums 1*a* to 1*d*. With this, the intermediate transfer belt 8 and the photosensitive drums 1*a* to 1*d* can be suppressed from coming into contact with each other by the operations to install/remove the intermediate transfer unit 30 into/from the apparatus main body 101.

Further, as described above, the length L1 is set to be smaller than the length L2 (refer to FIG. 4). With this, even when the intermediate transfer unit 30 comes close to the photosensitive drums 1*a* to 1*d* at the times when the intermediate transfer unit 30 is installed into and removed from the apparatus main body 101, before the intermediate transfer belt 8 and the photosensitive drums 1*a* to 1*d* come into contact with each other, the first protrusion 34 and the first regulating guide 37 are likely to come into contact with each other. As described above, when the first protrusion 34 and the first regulating guide 37 come into contact with each other, the intermediate transfer belt 8 and the photosensitive drums 1*a* to 1*d* are suppressed from coming into contact with each other. Thus, by setting the length L1 to be smaller than the length L2, the intermediate transfer belt 8 can be more satisfactorily suppressed from coming into contact with the photosensitive drums 1*a* to 1*d*.

Still further, as described above, at the time when the intermediate transfer unit 30 is installed into the apparatus main body 101, the first regulating guide 37 guides the intermediate transfer unit 30 to the installation position in the apparatus main body 101. Thus, the intermediate transfer unit 30 is easily installed into the apparatus main body 101 in a manner that the photosensitive drums 1*a* to 1*d* and the intermediate transfer belt 8 do not come into contact with each other. The same applies to the removal of the intermediate transfer unit 30 from the apparatus main body 101.

Yet further, as described above, under the state in which the intermediate transfer unit 30 is placed on the placement surface A, the intermediate transfer belt 8 is away from the placement surface A. Thus, even when the intermediate transfer unit 30 is placed on a flat surface (the placement surface A) of, for example, a work table for maintenance, replacement, or the like, the intermediate transfer belt 8 can be suppressed from being damaged or fouling.

Yet further, hitherto, there have been intermediate transfer units employing a configuration including movable leg portions that cause the intermediate transfer units to retract from the photosensitive drums 1*a* to 1*d* (to an inside of the intermediate transfer belt 8) at the time when the intermediate transfer units are installed into the apparatus main body 101, and to protrude to an outside of the intermediate transfer belt 8 at the time when the intermediate transfer units are placed on the placement surface A. In comparison with the intermediate transfer units having such a related-art configuration, in the intermediate transfer unit 30 according to this embodiment, the first protrusion 34, the second protrusion 35, and the third protrusion 36 are formed integrally with the frame 33. Thus, the intermediate transfer unit 30 according to this embodiment not only can be simplified in structure, but also can suppress the intermediate transfer belt 8 from coming into contact with the placement surface A at the time when the intermediate transfer unit 30 is placed on the placement surface A.

In addition, the present disclosure is not limited to the embodiment described hereinabove, and various modifications may be made within the gist of the present disclosure. For example, the third protrusion 36 need not necessarily be provided on the side that is opposite to the side where the first protrusion 34 is present relative to the intermediate transfer belt 8 therebetween in the belt width direction. Instead, a configuration in which the third protrusion 36 is provided on the same side as the side where the first protrusion 34 is present may be employed.

Further, the present disclosure is applicable not only to the tandem-type color printer as illustrated in FIG. 1, but also to various other image-forming apparatuses that use the intermediate transfer unit, such as a color copying machine, a color multifunction peripheral, and a facsimile machine.

The present disclosure is appliable to intermediate transfer units including an endless intermediate-transfer belt. By the application of the present disclosure, image forming apparatuses capable of suppressing the intermediate transfer belt from coming into contact with the image bearing members at times of operations to install/remove the intermediate transfer unit into/from main bodies of the image forming apparatuses.

What is claimed is:

1. An image forming apparatus, comprising:
an apparatus main body;
an intermediate transfer unit
that includes an endless intermediate-transfer belt, and
that can be installed into and removed from the apparatus main body; and
an image-bearing-member unit
that faces the endless intermediate-transfer belt in an upper-and-lower direction, and
that is configured to form an image on an outer peripheral surface of the endless intermediate-transfer belt,
the image-bearing-member unit including an image bearing member
that faces the endless intermediate-transfer belt, and
that is configured to bear a toner image on an outer peripheral surface of the image bearing member,
the intermediate transfer unit including
a frame that is arranged inside the endless intermediate-transfer belt,
a drive roller
that is supported to be rotatable by the frame, and
that is configured to rotate the endless intermediate-transfer belt by being held in press contact with an inner peripheral surface of the endless intermediate-transfer belt,
a tension roller
that is supported to be rotatable by the frame, and
that is rotated along with the rotation of the endless intermediate-transfer belt by being held in press contact with the inner peripheral surface of the endless intermediate-transfer belt, and
that is configured to apply predetermined tension to the endless intermediate-transfer belt by being held in press contact with the inner peripheral surface of the endless intermediate-transfer belt, and
a transfer roller
that is supported to be rotatable by the frame, and
that is movable between
a transfer position at which the transfer roller transfers the toner image borne on the outer peripheral surface of the image bearing member onto the outer peripheral surface of the endless intermediate-transfer belt by being held in press contact with the image bearing member with the endless intermediate-transfer belt sandwiched between the transfer roller and the image bearing member, and
a retractive position to which the transfer roller that has been separated together with the endless intermediate-transfer belt from the image bearing member comes,
the frame including a first protrusion that protrudes in the upper-and-lower direction to a side where the image-bearing-member unit is present relative to the outer peripheral surface of the endless intermediate-transfer belt,
the image-bearing-member unit further including a first regulating guide
that extends in an axial direction of the image bearing member, and
that faces the first protrusion in the upper-and-lower direction,
the endless intermediate-transfer belt and the image bearing member facing each other with a predetermined length between the endless intermediate-transfer belt and the image bearing member under a state
in which the first protrusion and the first regulating guide are held in contact with each other, and
in which the transfer roller has come to the retractive position.

2. The image forming apparatus according to claim 1,
wherein the first protrusion is located on an outside in a belt width direction of the endless intermediate-transfer belt, the belt width direction being orthogonal to a direction of the rotation of the endless intermediate-transfer belt, and
wherein the frame further includes
a second protrusion
that is arranged on a side which is opposite to a side where the first protrusion is present relative to the endless intermediate-transfer belt between the second protrusion and the first protrusion in the belt width direction, and
that protrudes in the upper-and-lower direction to the side where the image-bearing-member unit is present relative to the outer peripheral surface of the endless intermediate-transfer belt, and
a third protrusion
that is arranged on a side which is opposite to a side where one of the first protrusion and the second protrusion is present relative to a center of the frame between the third protrusion and the one of the first protrusion and the second protrusion in a belt moving direction that is orthogonal to the upper-and-lower direction and the belt width direction, and
that protrudes in the upper-and-lower direction to the side where the image-bearing-member unit is present relative to the outer peripheral surface of the endless intermediate-transfer belt.

3. The image forming apparatus according to claim 2, wherein the image-bearing-member unit is installed into the apparatus main body in a manner that allows the image-bearing-member unit to be installed and removed, wherein the first protrusion and the second protrusion are located on one side in the belt moving direction among sides of the image-bearing-member unit, wherein the third protrusion is located on another side in the belt moving direction among the sides of the image-bearing-member unit, wherein the apparatus main body includes a second regulating guide that extends along the axial direction of the image bearing member, and that faces the third protrusion in the upper-and-lower direction, and wherein the endless intermediate-transfer belt and the image bearing member face each other with a predetermined length between the endless intermediate-transfer belt and the image bearing member under a state in which the third protrusion and the second regulating guide are held in contact with each other, and in which the transfer roller has come to the retractive position.

4. The image forming apparatus according to claim 3, wherein the image-bearing-member unit includes a plurality of image-bearing-member units that are arrayed along the belt moving direction, and that respectively include a plurality of image bearing members, wherein the first protrusion is located on an outside in the belt moving direction of the plurality of image bearing members, and wherein the third protrusion is located on the outside in the belt moving direction of the plurality of image bearing members, and on a side that is opposite to a side where the first protrusion is present in the belt moving direction.

5. The image forming apparatus according to claim 2, wherein, when the intermediate transfer unit is placed on a placement surface while a distal end of each of the first protrusion, the second protrusion, and the third protrusion is held in contact with the placement surface, a predetermined length measures between a lower surface of the endless intermediate-transfer belt and the placement surface.

* * * * *